UNITED STATES PATENT OFFICE.

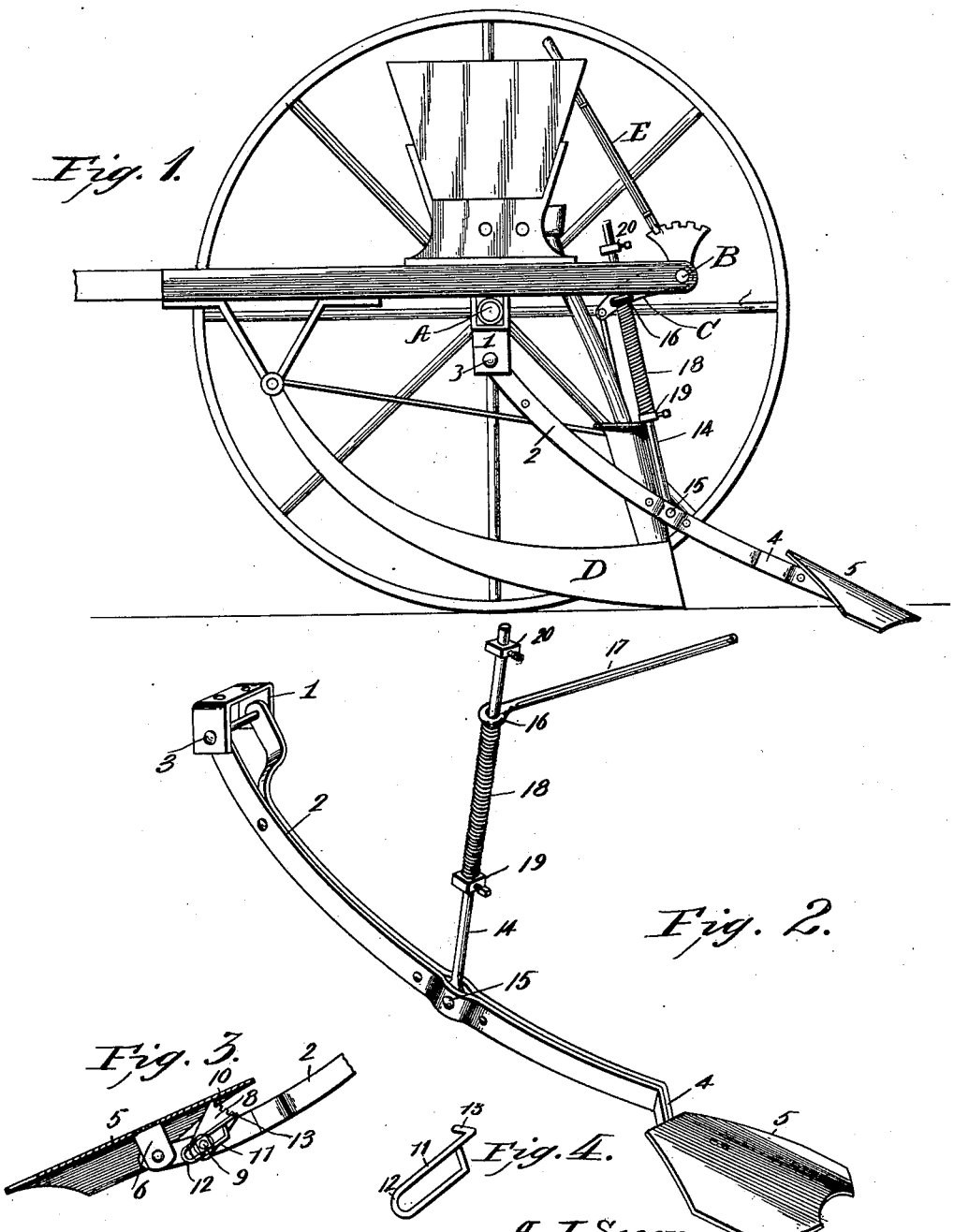

ANTHONY J. SECOR AND EZRA SECOR, OF DOWAGIAC, MICHIGAN.

WHEEL-TRACK COVERER.

SPECIFICATION forming part of Letters Patent No. 676,476, dated June 18, 1901.

Application filed April 8, 1901. Serial No. 54,909. (No model.)

*To all whom it may concern:*

Be it known that we, ANTHONY J. SECOR and EZRA SECOR, citizens of the United States, residing at Dowagiac, in the county of Cass and State of Michigan, have invented a new and useful Wheel-Track Coverer, of which the following is a specification.

Our invention is an improved wheel-track coverer for grain-drills and other agricultural machines, the object of our invention being to provide attachments for machines of this character, which attachments are efficient in covering and obliterating the tracks made in the soil by the supporting-wheels of the said machines.

Our invention consists in the peculiar construction and combination of devices hereinafter fully set forth, and pointed out in the claims.

In the accompanying drawings, Figure 1 is a side elevation of a grain-drill provided with a wheel-track coverer embodying our improvements, the near wheel of the grain-drill being removed. Fig. 2 is a detail perspective view of our improved wheel-track-coverer attachment. Fig. 3 is a detail view, partly in section, showing the rear portion of the trail-bar, the coverer-plate, and the devices for adjusting and securing the coverer-plate at any required angle on the trail-bar. Fig. 4 is a detail perspective view of the detent-loop.

In the embodiment of our invention we provide a clip 1, which may be bolted or otherwise secured to an axle or other suitable portion of a grain-drill or other agricultural machine. A curved trail-bar 2 has its front end pivotally connected to the clip by a bolt 3. By this means the rear end of the trail-bar is adapted to be raised and lowered. In the form of our invention here shown the trail-bar is provided with an oblique offset 4, whereby the extreme rear portion of the trail-bar is disposed in rear of the wheel on the axle. On the upper side of the trail-bar, at the rear end thereof, is a coverer-plate 5, which may be of any suitable form and construction, the preferred form thereof being shown in the drawings. The said coverer-plate is provided on its lower side with ears or lugs 6, which embrace the rear end of the trail-bar and bear on opposite sides thereof, and a pivotal bolt 6, which passes through alined openings in said ears or lugs and near the rear end of the trail-bar, pivotally attaches the coverer-plate to the trail-bar and adapts the coverer-plate to be disposed at any desired inclination with reference to the ground. The rear portion of the coverer-plate extends below the level of the rear end of the trail-bar. An adjusting-arm 8 is pivoted on the trail-bar, near the rear end thereof, by a bolt 9. The front end of the said adjusting-arm is notched or serrated, as at 10. A detent 11, which comprises a loop 12, secured and adapted to slip on the bolt 9, has at its front end a transversely-extending locking-finger 13, which may be engaged with the notches or serrations 10 when the adjusting-arm is disposed in such position as to support the coverer-plate at the required angle, and thereby lock said adjusting-arm and coverer-plate in position. A rod 14 has its lower end pivotally connected to the trail-bar, near the center of the latter, as at 15. The said rod is guided and supported in the eye 16 of a suitable lifting-rod or other support 17. A coiled extensile spring of suitable strength is placed on the rod 14 and bears between the lifting-rod and an adjustable collar or nut 19 on the bearing-rod 14. The said spring is indicated by the reference-numeral 18 and the preferred form thereof is shown in the drawings; but any suitable form of spring may be employed to bear downward on the trail-bar and coverer-plate to cause the latter to run as deeply in the soil as may be required, and we do not limit ourselves in this particular. Near the upper end of the bearing-rod 14 is a collar or nut 20.

To render the operation of our improved wheel-track coverer clear, we have, in Fig. 1 of the drawings, shown the same attached in operative position to a seed-drill of common construction. In the said figure, A represents the axle, to which the clip 1 is secured, B represents the rock-shaft, having the lifting-arms C for raising and lowering the runners D, and E represents the lever for operating the shaft B. The lifting-rod 17 of our attachment is secured to the lifting-arm C, and it will be understood that when the rock-shaft is operated to raise the runners D the lifting-rod 17 will be raised thereby, caused to engage the collar or nut 20 near the upper end of bearing-rod 14, and raise the rear end of the trail-bar and the coverer-plate from the ground.

It will be understood that our improved coverer attachment may be connected to the machine in any other suitable manner, and we do not limit ourselves in this particular.

Having thus described our invention, we claim—

1. The combination of a trail-bar, a coverer-plate pivotally attached to the rear end thereof, whereby said coverer-plate may be inclined to any desired angle on said trail-bar, and means to secure said coverer-plate when adjusted substantially as described.

2. A wheel-track coverer for grain-drills, comprising a spring-depressed trail-bar, a coverer-plate pivotally attached to the rear end thereof and thereby adapted to be inclined to any desired angle, and means to secure said coverer-plate when adjusted, substantially as described.

3. In a wheel-track coverer for grain-drills, the combination of a trail-bar, a coverer-plate pivotally connected to the rear end thereof and thereby adapted to be inclined to any desired angle, an adjusting-arm pivoted to said trail-bar and bearing under the front portion of said coverer-plate, and a detent to lock said adjusting-arm, substantially as described.

4. In a wheel-track coverer for grain-drills, the combination of a trail-bar, a coverer-plate pivotally connected to the rear end thereof and thereby adapted to be inclined to any desired angle, an adjusting-arm pivoted to said trail-bar and bearing under the front portion of said coverer-plate, said adjusting-arm having its front end notched or serrated, and a detent-loop, also pivotally connected to said trail-bar, and adapted to engage said notched or serrated end of said adjusting-arm, to lock said arm, substantially as described.

In testimony that we claim the foregoing as our own we have hereto affixed our signatures in the presence of two witnesses.

ANTHONY J. SECOR.
EZRA SECOR.

Witnesses:
LEE S. JONES,
F. M. FLUKE.